US011900904B2

(12) United States Patent
Sullivan et al.

(10) Patent No.: US 11,900,904 B2
(45) Date of Patent: Feb. 13, 2024

(54) CROWD-SOURCED TECHNIQUE FOR PITCH TRACK GENERATION

(71) Applicant: SMULE, INC., San Francisco, CA (US)

(72) Inventors: Stefan Sullivan, San Francisco, CA (US); John Shimmin, San Francisco, CA (US); Dean Schaffer, San Francisco, CA (US); Perry R. Cook, Jacksonville, OR (US)

(73) Assignee: Smule, Inc., San Francisco, CA (US)

( * ) Notice: Subject to any disclaimer, the term of this patent is extended or adjusted under 35 U.S.C. 154(b) by 0 days.

(21) Appl. No.: 17/651,022

(22) Filed: Feb. 14, 2022

(65) Prior Publication Data

US 2023/0005463 A1 Jan. 5, 2023

Related U.S. Application Data

(60) Continuation of application No. 16/665,611, filed on Oct. 28, 2019, now Pat. No. 11,250,826, which is a (Continued)

(51) Int. Cl.
*G10H 1/36* (2006.01)

(52) U.S. Cl.
CPC ....... *G10H 1/366* (2013.01); *G10H 2210/331* (2013.01); *G10H 2240/056* (2013.01); *G10H 2250/015* (2013.01); *G10H 2250/021* (2013.01)

(58) Field of Classification Search
CPC ............. G10H 1/366; G10H 2220/011; G10H 2210/331; G10H 2210/066; G10H 2240/251; G10H 2240/056; G10H 1/368; G10H 1/361; G10H 1/0008; G10H 2210/091; G10H 1/0041; G10H 2240/175; G10H 2240/061; G10H 1/365;
(Continued)

(56) References Cited

U.S. PATENT DOCUMENTS

| | | | | |
|---|---|---|---|---|
| 9,307,337 | B2 * | 4/2016 | Fonseca, Jr. | H04R 29/008 |
| 9,412,390 | B1 * | 8/2016 | Chaudhary | G10L 21/00 |
| 10,284,985 | B1 * | 5/2019 | Chaudhary | H04R 29/004 |
| 10,460,711 | B2 * | 10/2019 | Sullivan | G10H 1/366 |
| 11,250,826 | B2 * | 2/2022 | Sullivan | G10H 1/366 |
| 11,545,123 | B2 * | 1/2023 | Salazar | G06F 3/165 |

(Continued)

FOREIGN PATENT DOCUMENTS

| | | | | |
|---|---|---|---|---|
| KR | 100917991 B1 * | 9/2009 | | |
| WO | WO-9622592 A1 * | 7/1996 | | G10H 1/20 |
| WO | WO-2017075497 A1 * | 5/2017 | | G06F 3/167 |

*Primary Examiner* — Marlon T Fletcher
(74) *Attorney, Agent, or Firm* — Haynes and Boone, LLP

(57) ABSTRACT

Digital signal processing and machine learning techniques can be employed in a vocal capture and performance social network to computationally generate vocal pitch tracks from a collection of vocal performances captured against a common temporal baseline such as a backing track or an original performance by a popularizing artist. In this way, crowd-sourced pitch tracks may be generated and distributed for use in subsequent karaoke-style vocal audio captures or other applications. Large numbers of performances of a song can be used to generate a pitch track. Computationally determined pitch trackings from individual audio signal encodings of the crowd-sourced vocal performance set are aggregated and processed as an observation sequence of a trained Hidden Markov Model (HMM) or other statistical model to produce an output pitch track.

18 Claims, 3 Drawing Sheets

Related U.S. Application Data division of application No. 15/649,040, filed on Jul. 13, 2017, now Pat. No. 10,460,711.

(60) Provisional application No. 62/361,789, filed on Jul. 13, 2016.

(58) Field of Classification Search
CPC ....... G10H 2240/145; G10H 2220/101; G10H 2210/151; G10H 2240/071; G10H 2240/325; G10H 2240/241; G10H 1/0066; G10H 2220/106; G10H 2240/311; G10H 2210/081; G10H 2210/325; G10H 2210/005; G10H 2210/051; G10H 1/36; G10H 2240/075; G10H 1/08; G10H 3/125; G10H 2250/015; G10H 2210/031; G10H 2240/026; G10H 2210/021
See application file for complete search history.

(56) References Cited

U.S. PATENT DOCUMENTS

| | | | | |
|---|---|---|---|---|
| 2011/0251842 | A1* | 10/2011 | Cook | G10L 21/013 704/207 |
| 2012/0089390 | A1* | 4/2012 | Yang | G10L 21/04 704/207 |
| 2014/0349761 | A1* | 11/2014 | Kruge | G10H 1/386 463/35 |
| 2015/0255082 | A1* | 9/2015 | Cook | G10L 13/0335 704/207 |
| 2016/0057316 | A1* | 2/2016 | Godfrey | G10L 13/0335 704/207 |
| 2016/0358595 | A1* | 12/2016 | Sung | G11B 27/031 |
| 2017/0124999 | A1* | 5/2017 | Hersh | H04N 21/43615 |
| 2018/0018949 | A1* | 1/2018 | Sullivan | G10H 1/366 |
| 2019/0266987 | A1* | 8/2019 | Yang | G10L 21/013 |
| 2020/0312290 | A1* | 10/2020 | Sullivan | G10H 1/366 |
| 2023/0005463 | A1* | 1/2023 | Sullivan | G10H 1/366 |

* cited by examiner

CROWD-SOURCED TECHNIQUE FOR PITCH TRACK GENERATION

CROSS-REFERENCE TO RELATED APPLICATION(S)

The present application is a continuation patent application of Ser. No. 16/665,611, filed Oct. 28, 2019, which is a divisional patent application of U.S. Nonprovisional application Ser. No. 15/649,040, filed Jul. 13, 2017, which claims priority of U.S. Provisional Application No. 62/361,789, filed Jul. 13, 2016, which are hereby incorporated by reference in their entirety.

BACKGROUND

Field of the Invention

The invention relates generally to processing of audio performances and, in particular, to computational techniques suitable for generating a pitch track from vocal audio performances sourced from a plurality of performers and captured at a respective plurality of vocal capture platforms.

Description of the Related Art

The installed base of mobile phones, personal media players, and portable computing devices, together with media streamers and television set-top boxes, grows in sheer number and computational power each day. Hyper-ubiquitous and deeply entrenched in the lifestyles of people around the world, many of these devices transcend cultural and economic barriers. Computationally, these computing devices offer speed and storage capabilities comparable to engineering workstation or workgroup computers from less than ten years ago, and typically include powerful media processors, rendering them suitable for real-time sound synthesis and other musical applications. Partly as a result, some modern devices, such as iPhone®, iPad®, iPod Touch® and other iOS® or Android devices, support audio and video processing quite capably, while at the same time providing platforms suitable for advanced user interfaces. Indeed, applications such as the Smule Ocarina™, Leaf Trombone®, I Am T-Pain™, AutoRap®, Sing! Karaoke™, Guitar! By Smule®, and Magic Piano® apps available from Smule, Inc. have shown that advanced digital acoustic techniques may be delivered using such devices in ways that provide compelling musical experiences.

One application domain in which exploitations of digital acoustic techniques have proven particularly successful is audiovisual performance capture, including karaoke-style capture of vocal audio. For vocal capture applications designed to appeal to a mass-market and for at least some user demographics, an important contributor to user experience can be the availability of a large catalog of high-quality vocal scores, including vocal pitch tracks for the very latest musical performances popularized by a currently popular set of vocal artists. Because the set of currently popular vocalists and performances is constantly changing, it can be a daunting task to generate and maintain a content library that includes vocal pitch tracks for an ever changing set of titles.

As a result, many karaoke-style applications omit features that might otherwise be desirable if suitable content, including vocal pitch tracks, were readily available for new music releases and works for which vocal scores are not widely published. In contrast, some features of advanced karaoke-style vocal capture implementations and, indeed, some compelling aspects of the user experience thereof, including provision of performance-synchronized (or synchronizable) vocal pitch cues, real-time continuous pitch correction of captured vocal performances, auto-harmony generation, user performance grading, competitions etc., can depend upon availability of high-quality musical scores, including pitch tracks.

To support these and other features, automated and/or semi-automated techniques are desired for production of musical scoring content, including pitch tracks. In particular, automated and/or semi-automated techniques are desired for production of vocal pitch tracks for use in mass-market, karaoke-style vocal capture applications.

SUMMARY

It has been discovered that digital signal processing and machine learning techniques can be employed in a vocal capture and performance social network to computationally generate vocal pitch tracks from a collection of vocal performances captured against a common temporal baseline such as a backing track. In this way, crowd-sourced pitch tracks may be generated and distributed for use in subsequent karaoke-style vocal audio captures or other applications.

In some embodiments in accordance with the present invention(s), a method includes receiving a plurality of audio signal encodings for respective vocal performances captured in correspondence with a backing track, processing the audio signal encodings to computationally estimate, for each of the vocal performances, a time-varying sequence of vocal pitches and aggregating the time-varying sequences of vocal pitches computationally estimated from the vocal performances. The method includes supplying, based at least in part on the aggregation, a computer-readable encoding of a resultant pitch track for use as either or both of (i) vocal pitch cues and (ii) pitch correction note targets in connection with karaoke-style vocal captures in correspondence with the backing track.

In some embodiments, the method further includes crowd-sourcing the received audio signal encodings from a geographically distributed set of network-connected vocal capture devices. In some embodiments, the method further includes time-aligning the received audio signal encodings to account for differing audio pipeline delays at respective vocal capture devices. In some embodiments, the aggregating includes, on a per-frame basis, a weighted distribution of pitch estimates from respective of the vocal performances. In some embodiments, the weighting of individual ones of the pitch estimates is based at least in part on confidence ratings determined as part of the computational estimation of vocal pitch.

In some embodiments, the method further includes processing the aggregated time-varying sequences of vocal pitches in accordance with a statistically-based, predictive model for vocal pitch transitions typical of a musical style or genre with which the backing track is associated. In some embodiments, the method further includes supplying the resultant pitch track to network-connected vocal capture devices as part of data structure that encodes temporal correspondence of lyrics with the backing track.

In some embodiments in accordance with the present invention(s), a pitch track generation system includes a first geographically distributed set of network-connected devices and a service platform. The first geographically distributed set of network-connected devices is configured to capture audio signal encodings for respective vocal performances in correspondence with a backing track. The service platform is configured to receive and process the audio signal encodings to computationally estimate, for each of the vocal performances, a time-varying sequence of vocal pitches and to aggregate the time-varying sequences of vocal pitches in preparation of a crowd-sourced pitch track.

In some embodiments, the system further includes a second geographically distributed set of the network-connected devices communicatively coupled to receive the crowd-sourced pitch track for use in correspondence with the backing track as either or both of (i) vocal pitch cues and (ii) pitch correction note targets in connection with karaoke-style vocal captures at respective ones of the network-connected devices. In some embodiments, the service platform is further configured to time-align the received audio signal encodings to account for differing audio pipeline delays at respective of ones the network-connected devices.

In some embodiments, the aggregating includes determining at the service platform, on a per-frame basis, a weighted distribution of pitch estimates from respective ones of the vocal performances. In some embodiments, the weighting of individual ones of the pitch estimates is based at least in part on confidence ratings determined as part of the computational estimation of vocal pitch. In some embodiments, the service platform is further configured to process the aggregated time-varying sequences of vocal pitches in accordance with a statistically-based, predictive model for vocal pitch transitions. In some cases or embodiments, the statistically-based, predictive model for vocal pitch transitions typical of a musical style or genre with which the backing track is associated.

In some embodiments in accordance with the present invention(s), a method of preparing a computer readable encoding of a pitch track includes receiving, from respective geographically-distributed, network-connected, portable computing devices configured for vocal capture, respective audio signal encodings of respective vocal audio performances separately captured at the respective network-connected portable computing devices against a same backing track, computationally estimating both a pitch and a confidence rating for corresponding frames of the respective audio signal encodings, aggregating results of the estimating on a per-frame basis as a weighted histogram of the pitch estimates using the confidence ratings as weights, and using a Viterbi-type dynamic programming algorithm to compute at least a precursor for the pitch track based on a trained Hidden Markov Model (HMM) and the aggregated histogram as an observation sequence of the trained HMM.

In some embodiments, the method further includes time-aligning the respective audio signal encodings prior to the pitch estimating. In some cases or embodiments, the time-aligning is based, at least in part, on audio-signal path metadata particular to the respective geographically-distributed, network-connected, portable computing devices on which the respective vocal audio performances were captured. In some cases or embodiments, the time-aligning is based, at least in part, on digital signal processing that identifies corresponding audio features in the respective audio signal encodings. In some cases or embodiments, the per-frame computational estimation of pitch is based on a YIN pitch-tracking algorithm.

In some embodiments, the method further includes selecting, for use in the pitch estimating, a subset of the vocal audio performances separately captured against the same backing track, wherein the selection is based on correspondence of computationally-defined audio features. In some cases or embodiments, the computationally-defined audio features include either or both of spectral peaks and frame-wise autocorrelation maxima. In some cases or embodiments, the selection is based on either or both of spectral clustering of the performances and a thresholded distance from a calculated mean in audio feature space.

In some embodiments, the method further includes training the HMM. In some cases or embodiments, the training includes, for a selection of vocal performances and corresponding preexisting pitch track data: sampling both the pitch track and audio encodings of the vocal performances at a frame-rate; computing transition probabilities for (i) silence to each note, (ii) each note to silence, (iii) each note to each other note and (iv) each note to a same note; and computing emission probabilities based on an aggregation of pitch estimates computed for the selection of vocal performances. In some cases or embodiments, the training employs a non-parametric descent algorithm to computationally minimize mean error over successive iterations of pitch tracking using HMM parameters on a selection of vocal performances.

In some embodiments, the method further includes (i) post-processing the HMM outputs by high-pass filtering and decimating to identify note transitions; (ii) based on timing of the identified note transitions, parsing samples of the HMM outputs into discrete MIDI events; and (iii) outputting the MIDI events as the pitch track. In some embodiments, the method further includes evaluating and optionally accepting the pitch track, wherein an error criterion for pitch track evaluation and acceptance normalizes for octave error. In some embodiments, the method further includes supplying the pitch track, as an automatically computed, crowd-sourced data artifact, to plural geographically-distributed, network-connected, portable computing devices for use in subsequent karaoke-type audio captures thereon.

In some embodiments, the method is performed, at least in part, on a content server or service platform to which the geographically-distributed, network-connected, portable computing devices are communicatively coupled. In some embodiments, the method is embodied, at least in part, as a computer program product encoding of instructions executable on a content server or service platform to which the geographically-distributed, network-connected, portable computing devices are communicatively coupled.

In some embodiments, the method further includes using the prepared pitch track in the course subsequent karaoke-type audio capture to (i) provide computationally determined performance-synchronized vocal pitch cues and (ii) drive real-time continuous pitch correction of captured vocal performances.

In some embodiments, the method further includes computationally evaluating correspondence of the audio signal encodings of respective vocal audio performances with the prepared pitch track and, based on the evaluated correspondence, selecting one or more of the respective vocal audio performances for use as a vocal preview track.

These and other embodiments in accordance with the present invention(s) will be understood with reference to the description and appended claims which follow.

BRIEF DESCRIPTION OF THE DRAWINGS

The present invention(s) are illustrated by way of examples and not limitation with reference to the accompanying figures, in which like references generally indicate similar elements or features.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Pitch track generating systems in accordance with some embodiments of the present invention leverage large numbers performances of a song (10s, 100s or more) to generate a pitch track. Such systems computationally estimate a temporal sequence of pitches from audio signal encodings of many performances captured against a common temporal baseline (typically an audio backing track for a popular song) and typically perform an aggregation of the estimated pitch tracks for the given song. A variety of pitch estimation algorithms may be employed to estimate vocal pitch including time-domain techniques such as algorithms based on average magnitude difference functions (AMDF) or autocorrelation, frequency-domain techniques and even algorithms that combine spectral and temporal approaches. Without loss of generality, techniques based a YIN estimator are described herein.

Aggregation of time-varying sequences of pitches estimated from respective vocal performances (e.g., aggregation of crowd sourced pitch tracks) can be based on factors such as pitch estimation confidences (e.g., for a given performance and frame) and/or other weighting or selection factors including factors based on performer proficiency metadata or computationally determined figures of merit for particular performances. In some embodiments, a pitch track generation system may employ statistically-based predictive models that seek to constrain frame-to-frame pitch transitions in a resultant aggregated pitch track based on pitch transitions that are typical of a training corpus of songs. For example, in an embodiment described herein, a system treats aggregated data as an observation sequence of a Hidden Markov Model (HMM). The HMM encodes constrained transition and emission probabilities that are trained into the model by performing transition and emission statistics calculations on a corpus of songs, e.g., using a song catalog that already includes score coded data such as MIDI-type pitch tracks. In general, the training corpus may be specialized to a particular musical genre or style and/or to a region, if desired.

Figure 1:
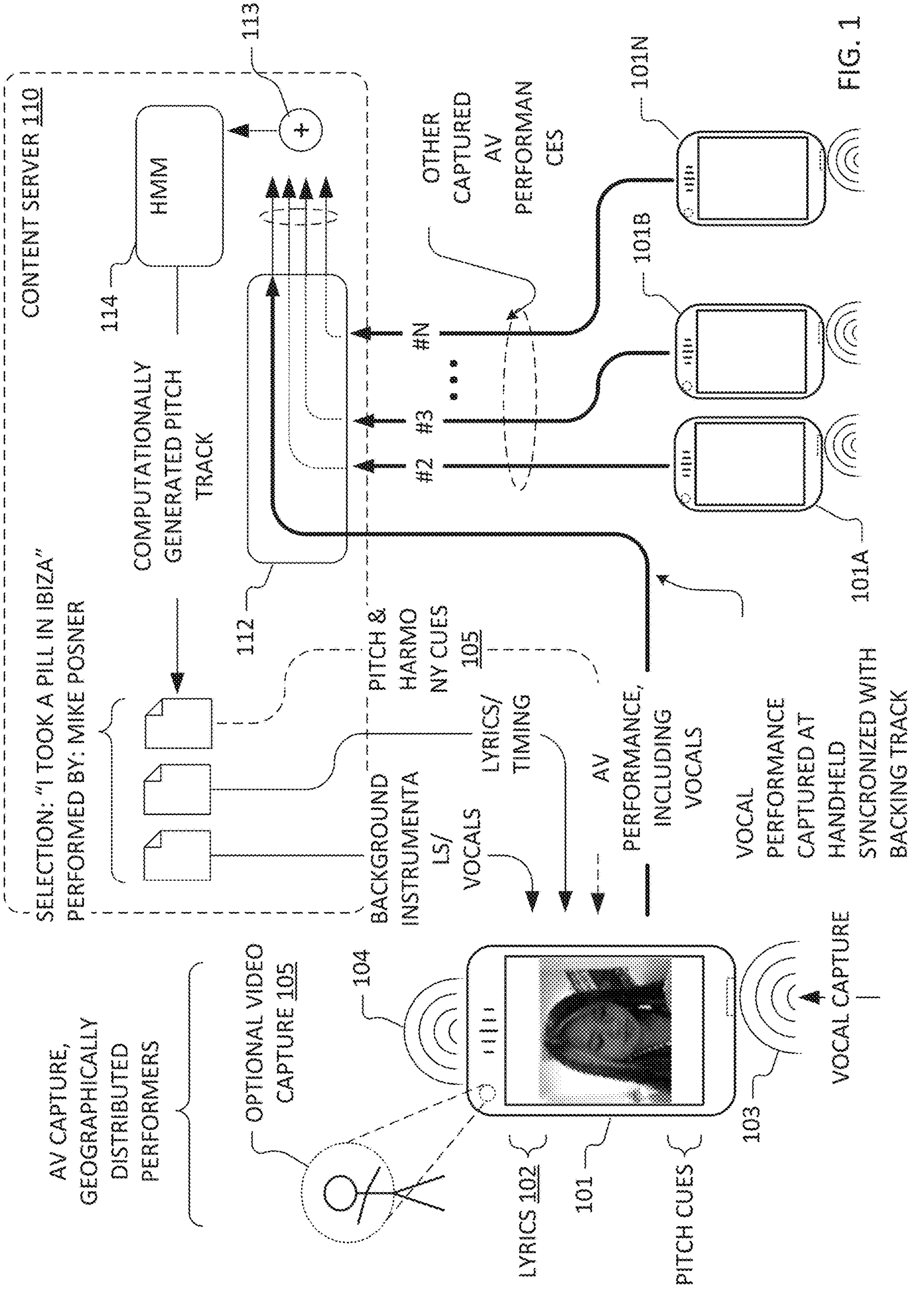
FIG. 1 depicts information flows amongst illustrative mobile phone-type portable computing devices and a content server in accordance with some embodiments of the present invention.

FIG. 1 depicts information flows amongst illustrative mobile phone-type portable computing devices (101, 101A, 101B . . . 101N) employed for vocal audio (or in some cases, audiovisual) capture and a content server 110 in accordance with some embodiments of the present invention. Content server 110 may be implemented as one or more physical servers, as virtualized, hosted and/or distributed application and data services, or using any other suitable service platform. Vocal audio captured from multiple performers and devices is processed using pitch tracking digital signal processing techniques (112) implemented as part of such a service platform and respective pitch tracks are aggregated (113). In some embodiments, the aggregation is represented as a histogram or other weighted distribution and is used as an observation sequence for a trained Hidden Markov Model (HMM 114) which, in turn, generates a pitch track as its output. A resultant pitch track (and in some cases or embodiments, derived harmony cues) may then be employed in subsequent vocal audio captures to support (e.g., at a mobile phone-type portable computing device 101 or a media streaming device or set-top box hosting a Sing! Karaoke™ application) real-time continuous pitch correction, visually-supplied vocal pitch cues, real-time user performance grading, competitions etc.

Figure 2:
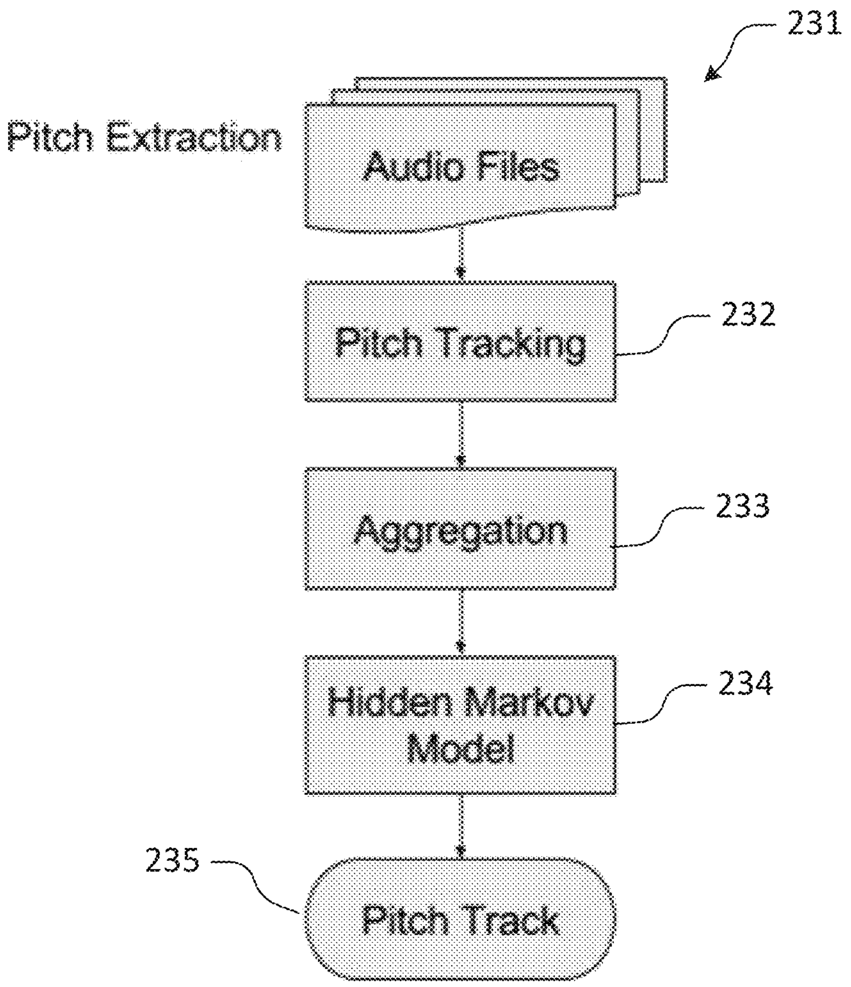
FIG. 2 depict a functional flow for an exemplary pitch track generation process that employs a Hidden Markov Model in accordance with some embodiments of the present invention.

In some exemplary implementations of these techniques, a process flow optionally includes selection of particular vocal performances and/or preprocessing (e.g., time-alignment to account for differing audio pipeline delays in the vocal capture devices from which a crowd-sourced set of audio signal encodings is obtained), followed by pitch tracking of the individual performances, aggregation of the resulting pitch tracking data and processing of the aggregated data using the HMM or other statistical model of pitch transitions. FIG. 2 depicts an exemplary functional flow for a portion of a pitch track generation process that employs an HMM in accordance with some embodiments of the present invention. Particular steps of the functional flow (including the computational estimation of vocal pitch from audio signal encodings of crowd sourced vocal performances [pitch tracking 232], aggregation 233 of pitch estimates, and statistical techniques such the use of HMM 234) are described in greater detail with reference to FIG. 2.

Optional Selection of Audio Encodings

In general, a set, database or collection 231 of captured audio signal encodings of vocal performances (or audio files) is stored at, received by, or otherwise available to a content server or other service platform and individual captured vocal performances are, or can be, associated with a backing track against which they were captured. Depending on design conditions and/or available datasets, pitch tracking (232) may be performed for some or all performances captures against a given backing track. While some embodiments rely on the statistical convergence of a large and generally representative sample, there are several options for selecting from the set of performances the recordings best suited for pitch tracking and/or further processing.

In some cases or embodiments, performance or performer metadata may be used to identify particular audio signal encodings that are likely to contribute musically-consistent voicing data to a crowd-sourced set of samples. Similarly, performance or performer metadata may be used to identify audio signal encodings that may be less desirable in, and therefore excluded from, the crowd-sourced set of samples. In some cases or embodiments, it is possible to use one or more computationally-determined audio features extracted from the audio signal encodings themselves to select particular performances that are likely to contribute useful data to a crowd-sourced set of samples. As discussed elsewhere herein relative of aggregation 233, some pitch estimation algorithms produce confidence metrics, and these confidence metrics may be thresholded and be used in selection as well as for aggregation. Additional exemplary audio features that may be employed in some cases or embodiment include:

spectrogram peaks (time-frequency locations) and
frame-wise autocorrelation maxima.

In general, selection is optional and may be employed at various stages of processing.

Option 1—No Selection

In some cases or embodiments, selection of a subset of performances is not necessary and/or may be omitted for simplicity. For example, when a sufficient number of performances are available to generate a confident pitch track for a song without filtering of outlier performances, selection may be unnecessary.

Option 2—Clustering

In some cases or embodiments, clustering techniques may be employed by performing audio feature extraction and clustering the performances using a spectral clustering algorithm to place audio signal encodings for vocal performances into 2 (or more) classes. A cluster that sits closest to the mean may be taken as the cluster that represents better pitch-trackable performances and may define the crowd-sources subset of vocal performances selected for use in subsequent processing.

Option 3—Mean Distance

In some cases or embodiments, feature extraction may be performed on some or all of the crowd-sourced audio signal encodings of vocal performances, and a mean and variance (or other measure of "distance") for each feature vector can be computed. In this way, a multi-dimensional distance from the mean weighted by the variance of each feature can be calculated for each vocal performance, and a threshold can be applied to select certain audio signal encodings for subsequent processing. In some cases or embodiments, a suitable threshold is the root-mean-square (RMS) of the standard deviation of all features.

$$\text{threshold} = \sqrt{\frac{1}{N}\sum_{n=1}^{N}\sigma_n^2}, \text{ for the set of } N \text{ features}$$

Persons of skill in the art having benefit of the present disclosure will appreciate a wide variety of selection criteria (whether metadata-based, audio-feature based, both metadata- and audio-feature based, or otherwise).

Preprocessing

In some cases or embodiments, individual audio signal encodings (or audio files) of set, database or collection 231 are preprocessed by (i) time-aligning the crowd-sourced audio performances based on latency metadata that characterizes the differing audio pipeline delays at respective vocal capture devices or using computationally-distinguishable alignment features in the audio signals and (ii) normalizing the audio signals, e.g., to have a maximum peak-to-peak amplitude on the range [−1 1]. After preprocessing, the audio signals are resampled at a sampling rate of 48 kHz.

In general, latency metadata may be sourced from respective vocal capture devices or a crowd-sourced device/configuration latency database may be employed. Commonly-owned, co-pending U.S. patent application Ser. No. 15/178,234, filed Jun. 9, 2016, entitled "CROWD-SOURCED DEVICE LATENCY ESTIMATION FOR SYNCHRONIZATION OF RECORDINGS IN VOCAL CAPTURE APPLICATIONS," and naming Chaudhary, Steinwedel, Shimmin, Jabr and Leistikow as describes suitable techniques for crowd-sourcing latency metadata. Commonly-owned, co-pending U.S. patent application Ser. No. 14/216,136, filed Mar. 14, 2016, entitled "AUTOMATIC ESTIMATION OF LATENCY FOR SYNCHRONIZATION OF RECORDINGS IN VOCAL CAPTURE APPLICATIONS," and naming Chaudhary as inventor describes additional techniques based on roundtrip device latency measurements. Each of the foregoing applications is incorporated herein by reference. In some cases or embodiments, time alignment may be performed using signal processing techniques to identify computationally-distinguishable alignment features such as vocal onsets or rhythmic features in the audio signal encodings themselves.

Pitch Tracking

In some cases or embodiments, vocal pitch estimation (pitch tracking 232) is performed by windowing the resampled audio with a window size of 1024 samples at a hop size of 512 samples using a Hanning window. Pitch-tracking is then performed on a per-frame basis using a YIN pitch-tracking algorithm. See Cheveigné and Kawahara, *YIN, A Fundamental Frequency Estimator for Speech and Music,* Journal of the Acoustical Society of America, 111:1917-30 (2002). Such a pitch tracker will return an estimated pitch between DC and Nyquist and a confidence rating between 0 and 1 for each frame. YIN pitch-tracking is merely an example technique. More generally, persons of skill in the art having benefit of the present disclosure will appreciate a variety of suitable pitch tracking algorithms that may be employed, including time-domain techniques such as algorithms based on average magnitude difference functions (AMDF), autocorrelation, etc., frequency-domain techniques, statistical techniques, and even algorithms that combine spectral and temporal approaches.

Aggregation

In some cases or embodiments, temporal sequences of pitch estimates (e.g., pitch tracks) calculated using a YIN technique are aggregated (233) by taking weighted histograms of pitch estimates across the performances per-frame, where the weights are, or are derived from, confidence ratings for the pitch estimates. In general, the pitch tracking algorithm may have a predefined minimum and maximum frequency of possible tracked notes (or pitches). In some implementations, notes (or pitches) outside the valid frequency range are treated as if they had zero or negligible confidence and thus do not meaningfully contribute to the information content of the histograms or to the aggregation.

As a practical matter, some crowd-sourced vocal performances may have audio files of different lengths. In such case, a maximum or full-length signal will typically-dictate the length of the entire aggregate. For individual performances whose audio signal encoding (or audio file) does not include a complete set of audio frames, e.g., an audio signal encoding missing the final or latter portion of frames, missing frames may be treated as if they had zero or negligible confidence and likewise do not meaningfully contribute any confidence to the information content of the histograms or to the aggregation. Aggregate pitches are typically quantized to discrete frequencies on a log-frequency scale.

Although aggregation based on confidence weighted histograms is described herein, other aggregations of crowd-sourced vocal pitch estimates may be employed in other embodiments including equal weight aggregations, and aggregations based on weightings other than those derived from the pitch estimating process itself, aggregations based on metadata weightings, etc. In general, persons of skill in the art having benefit of the present disclosure will appreciate a wide variety of techniques for aggregating frame-by-frame pitch estimates from crowd-sourced or other sets of vocal performances.

While some embodiments (such as described below) employ statistically-based techniques to operate on aggregated pitch estimates and thereby produce a resultant pitch track, it will be appreciated by persons of skill in the art having benefit of the present disclosure that, in some cases or embodiments, an aggregation of frame-by-frame pitch estimates from crowd-sourced or other sets of vocal performances may itself provide a suitable resultant pitch track, even without the use of statistical techniques that consider pitch transition probabilities.

Hidden Markov Model

In some cases or embodiments, a temporal sequence of confidence-weighted aggregate histograms is treated as an observation sequence of a Hidden Markov Model (HMM) 234. HMM 234 uses parameters for transition and emission probability matrices that are based on a constrained training phase. Typically, the transition probability matrix encodes the probability of transitioning between notes and silence, and transition from any note to any other note without encoding potential musical grammar. That is, all note transition probabilities are encoded with the same value. The emission probability matrix encodes the probability of observing a given note given a true hidden state. With this model, the system uses a Viterbi algorithm to find the path through the sequence of observations that optimally transitions between hidden-state notes and rests. The optimal sequence as computed by the Viterbi algorithm is taken as the output pitch track 235.

Training

Figure 3B:
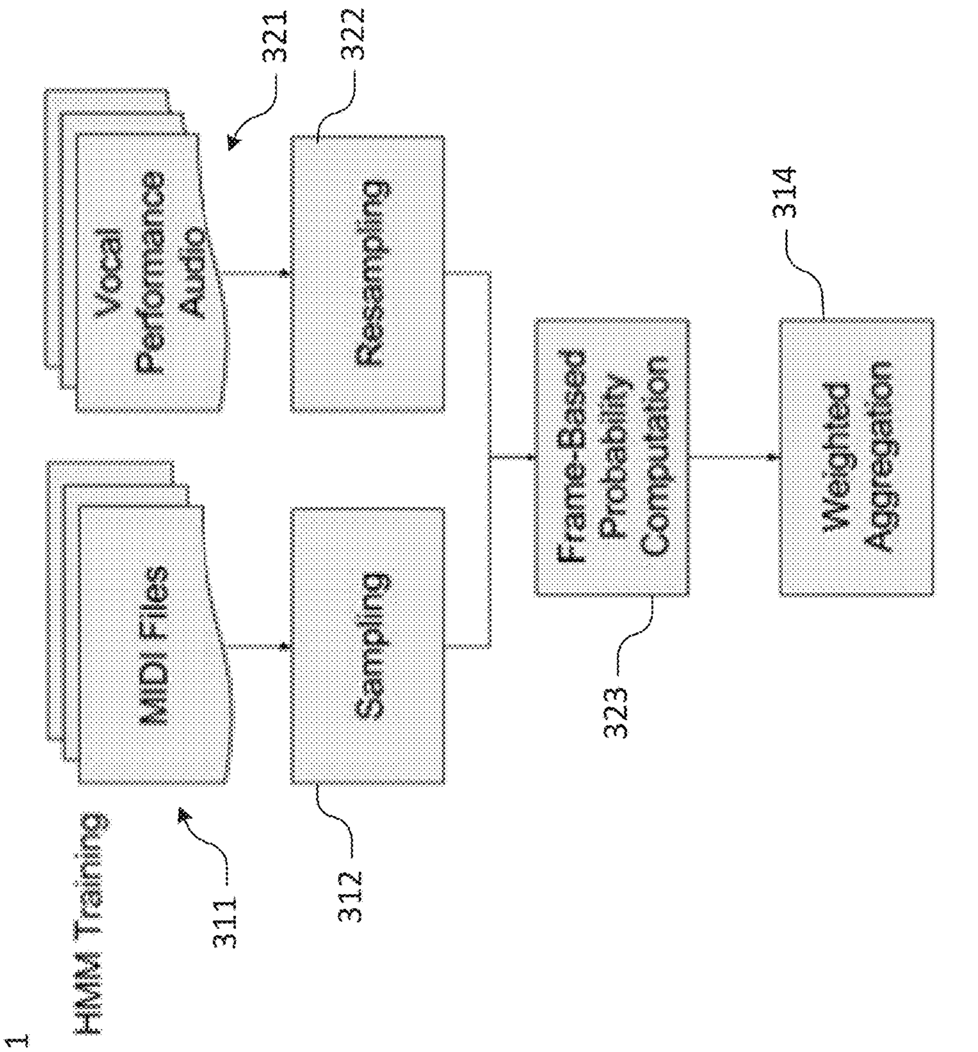
FIGS. 3A and 3B depict exemplary training flows for a Hidden Markov Model computation employed in accordance with some embodiments of the present invention.
Figure 3A:
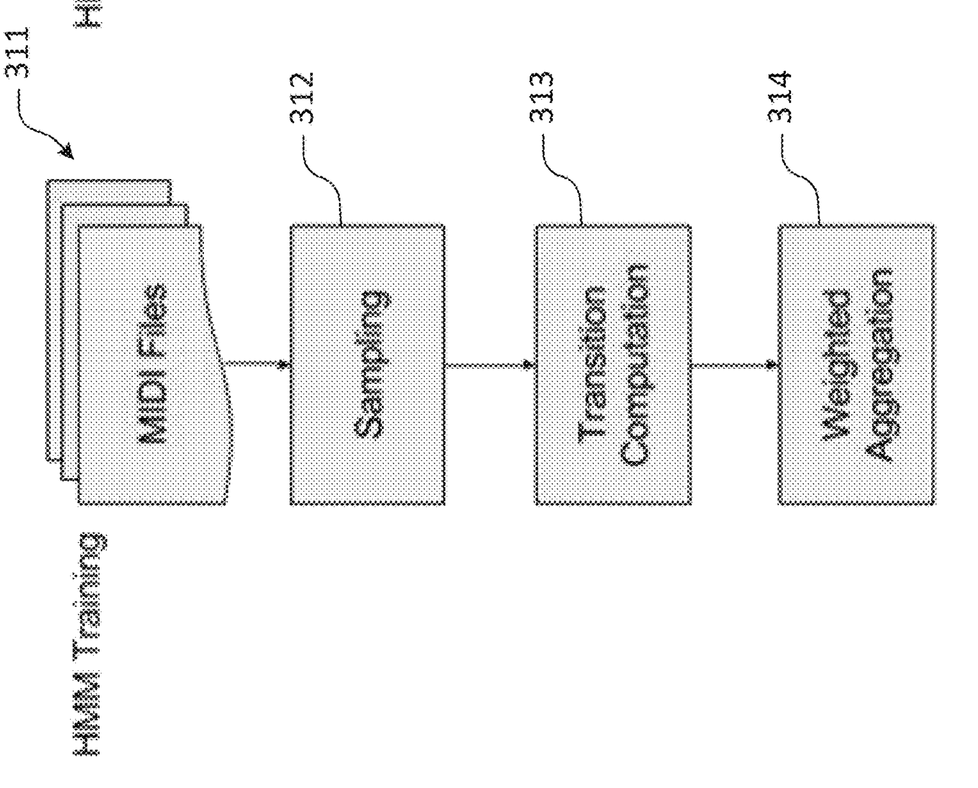

FIGS. 3A and 3B depict exemplary training flows for a Hidden Markov Model employed in accordance with some embodiments of the present invention. Training the HMM typically involves use of a database of songs with some coding of vocal pitch sequences (such as MIDI-type files containing vocal pitch track information) and a set of vocal audio performances for each such song. Training is performed by making observations on the vocal pitch sequence data. Typically, training is based a wide cross-section of songs from the database, including songs from different genres and countries of origin. In this way, HMM training may avoid learning overly genre- or region-specific musical tendencies. Nonetheless, in some cases or embodiments, it may be desirable to specialize the training corpus to a particular musical genre or style and/or to a country or region.

Whatever the stylistic or regional scope of the training corpus, it will be generally desirable, for each given song represented in the training corpus, to include multiple performances of the given song and to aggregate data in a manner analogous to that described above with respect to the observation sequences supplied to the trained HMM. Persons of skill in the art having benefit of the present disclosure will appreciate a variety of suitable variations on the training techniques detailed herein.

Option 1—Observing MIDI Data

In some variation of the described techniques, the training of transition probabilities is performed on symbolic MIDI data by computing (313, 323) a percentage of notes that transition (1) from silence to any particular note, (2) from any particular note to silence, (3) from any particular note to any other particular note, and (4) from any particular note to the same note. Referring to FIGS. 3A and 3B, MIDI data 311 is first parsed and sampled (312) at the same rate as the frame-rate of the note histograms computed from audio data (321, 322). Preferably, these transition probabilities are computed on the frame-by-frame samples (see 323), not on a note-by-note basis. This HMM training approach is described in greater detail, below.

Emission probabilities of the HMM are computing by performing on sets of performances for each song pitch tracking and aggregation (314) in a manner analogous to that described above with respect to crowd-sourced vocal performances. Error probabilities are computed (313, 323) on the basis of observing:

1. the weighted aggregate probability of observing silence in each frame of each song for all performances of that song where the MIDI pitch information for the given song indicates silence in the vocal pitch information for the given frames weighted by the number of silence frames,
2. the weighted aggregate probability of observing a given note in each frame for all performances of the given song where the MIDI pitch information for the given song indicates the given note,
3. the weighted aggregate probability of observing any other note in each frame for all performances of the given song where the MIDI pitch information for the given song indicates a given note,
4. the weighted aggregate probability of observing a silence in each frame of each song for all performances of that song where the MIDI pitch information for the given song indicates any note for all performances of that songs, and
5. the weighted aggregate probability of observing any note in each frame of each song for all performances of that song where the MIDI pitch information for the given song indicates silence for all performances of that song.

Option 2—Minibatch Descent

Since there is no parametric form of error as a function of the system parameters, a traditional gradient descent algorithm cannot generally be performed. However, there are non-parametric descent algorithms that can be used to optimize the HMM parameters, such as Markov chain Monte Carlo (MCMC), simulated annealing, and random walk techniques. For each of these cases, pitch tracking (or estimation) is performed using techniques such as described above, with HMM parameters initialized to reasonable values, in order that the optimization technique does not start at a local/global maximum. The descent algorithm follows the following procedure:

1. Pitch tracking with the given parameters is performed on a (sufficiently large) subset of songs (each using a corpus of performance recordings);
2. The mean error is computed on the subset of songs;
3. The parameters are updated randomly (within a reasonable range for their starting position);
4. Pitch tracking with the new parameters is performed on another subset of songs;
5. The mean error is computed; and
6. The difference between the mean error and the previous mean error is computed.
   a. If the difference is below a certain threshold and the mean error is below a certain threshold, descent is finished and the final parameters are recorded.
   b. Otherwise, the parameters are updated as a function of the change in error and the algorithm continues from step 4.

Option 3—Grid

An optimal transition matrix may be computed by partitioning the parameter space discretely and computing the mean error on a large batch of songs for each permutation of parameters. The mean error across all songs tracked is recorded along with the parameters used. The parameters which generate the minimum mean error are recorded.

Post-Processing

Referring back to FIG. 2, in some embodiments, HMM 234 outputs a series of smooth sample vectors indicating the pitch represented as MIDI note numbers as a function of time. These smooth sample vectors are high-pass filtered and decimated such that only the note transitions (onset, offset, and change) are captured, along with their original timing. These samples are then parsed into discrete MIDI events and written to a new MIDI file (pitch track 235) containing vocal pitch information for the given song. Note that typically, a pitch track is discarded from the results if it (1) fails to meet certain acceptance criteria and/or (2) fails to converge given the number of available performances.

Acceptance Criteria

In some cases, the pitch tracking algorithm fails to produce acceptable results. During post-processing the system decides if a pitch track (e.g., pitch track 235) should be outputted or not by taking measurements on the note histograms and the internal state of the HMM. In some cases or embodiments, decision thresholds are trained against an error criterion using the database of songs with MIDI vocal pitch information and an error metric described below. In some cases or embodiments, the decision boundary is trained using a simple Bayesian decision maximum likelihood estimation.

Convergence

Each song will have a set of performances on which to track pitch. In order to determine that the best possible pitch track has results from the set of performances, several metrics are computed from the rejection metrics by increasing the number of performances used in pitch tracking and computing the slopes of each of these metrics, as well as a mean-square distance between one generated pitch track and the previous. A generated pitch track for a song (e.g., pitch track 235) is not considered correct if the slope of the metrics never converges to certain pre-defined thresholds.

Error Estimation

Certain types of errors are easily tolerated (e.g. the entire pitch track being offset by an octave). In order to best represent pitch tracks that seem disturbing from a music theoretic perspective, certain classes of errors are computed.

1. For each frame where the MIDI indicates silence, but the generated pitch track has non-silence, the error is considered 1;
2. For each frame where the MIDI indicates a note, but the generated pitch track has silence, the error is considered 1; and
3. For all other frames, the error is computed as a simple magnitude distance These three types of errors are combined with weights to produce an overall error metric.

The generated MIDI track goes through a relative preprocessing before computing the above 3 error metrics, where a regional octave error (relative to the reference MIDI pitch information) is computed by taking a median-filtered frame-based octave error with median window of several seconds of duration. The purpose of this is to eliminate octave errors on a phrase-by-phrase basis, so that pitch tracks that are exactly correct, but shifted by octaves (within a particular region) are considered relatively more correct than pitch tracks with many notes that are incorrect, but always in the right octave.

Representative (or Preview) Performances

Based on the foregoing description, it will be appreciated that certain performances of a given song used as crowd-sourced samples may more closely correspond to the HMM-generated pitch track (235) for the given song than other crowd-sourced samples. In some cases or embodiments, it may be desirable to computationally evaluate correspondence of individual ones of the crowd-sourced vocal audio performances with the HMM-generated pitch track. In general, correspondence metrics can be established as a post-process step or as a byproduct of the aggregation and HMM observation sequence computations. Based on evaluated correspondence, one or more of the respective vocal audio performances may be selected for use as a vocal preview track or as vocals (lead, duet part A/B, etc.) against which subsequent vocalists will sing in a Karaoke-style vocal capture. In some cases or embodiments, a single "best match" (based on any suitable statistical measure) may be employed. In some cases or embodiments, a set of top matches may be employed, either as a rotating set or as montage, group performance, duet, etc.

VARIATIONS AND OTHER EMBODIMENTS

While the invention(s) is (are) described with reference to various embodiments, it will be understood that these embodiments are illustrative and that the scope of the invention(s) is not limited to them. Many variations, modifications, additions, and improvements are possible. For example, while pitch tracks generated from crowd-sourced vocal performances captured in accord with a karaoke-style interface have been described, other variations will be appreciated by persons of skill having benefit of the present disclosure. In some cases or embodiments, crowd-sourcing may be from a subset of the performers and/or devices that constitute a larger user base for pitch tracks generated using the inventive techniques. In some cases or embodiments, vocal captures from a set of power users or semi-professional vocalists (possibly including studio captures) may form, or be included in, the set of vocal performances from which pitches are estimated and aggregated. While some embodiments employ statistically-based techniques to constrain pitch transitions and to thereby produce a resultant pitch track, others may more directly resolve a weighted aggregate of frame-by-frame pitch estimates as a resultant pitch track.

While certain illustrative signal processing techniques have been described in the context of certain illustrative applications, persons of ordinary skill in the art will recognize that it is straightforward to modify the described techniques to accommodate other suitable signal processing techniques and effects. Likewise, references to particular sampling techniques, pitch estimation algorithms, audio features for extraction, score coding formats, statistical classifiers, dynamical programming techniques and/or machine learning techniques are merely illustrative. Persons of skill in the art having benefit of the present disclosure and its teachings will appreciate a range of alternatives to those expressly described.

Embodiments in accordance with the present invention may take the form of, and/or be provided as, one or more computer program products encoded in machine-readable media as instruction sequences and/or other functional constructs of software, which may in turn include components (particularly vocal capture, latency determination and, in some cases, pitch estimation code) executable on a computational system such as an iPhone handheld, mobile or portable computing device, media application platform or set-top box or (in the case of pitch estimation, aggregation, statistical modelling and audiovisual content storage and retrieval code) on a content server or other service platform to perform methods described herein. In general, a machine readable medium can include tangible articles that encode information in a form (e.g., as applications, source or object code, functionally descriptive information, etc.) readable by a machine (e.g., a computer, a server whether physical or virtual, computational facilities of a mobile or portable computing device, media device or streamer, etc.) as well as non-transitory storage incident to transmission of such applications, source or object code, functionally descriptive information. A machine-readable medium may include, but need not be limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:

receiving a plurality of audio signal encodings for respective vocal performances captured in correspondence with a backing track;

preprocessing the plurality of audio signal encodings for respective vocal performances, wherein the preprocessing comprises one or more of: time-aligning the audio signal encodings for respective vocal performances based on latency metadata, and normalizing the audio signal encodings for respective vocal performances;

identifying, from the plurality of audio signal encodings, a subset of audio signal encodings;

processing the subset of audio signal encodings to computationally estimate, for each of the vocal performances corresponding to the subset of audio signal encodings, a time-varying sequence of vocal pitches;

aggregating the time-varying sequences of vocal pitches computationally estimated from the vocal performances; and based at least in part on the aggregation, supplying a computer-readable encoding of a resultant pitch track for use as either or both of (i) vocal pitch cues and (ii) pitch correction note targets in connection with karaoke-style vocal captures in correspondence with the backing track.

2. The method of claim 1, wherein the step of identifying further comprises utilizing metadata associated with the plurality of audio signal encodings to identify the subset of audio signal encodings.

3. The method of claim 1, wherein the step of identifying further comprises extracting one or more audio features from each of the plurality of audio signal encodings to identify the subset of audio signal encodings.

4. The method of claim 3, further comprising:

identifying the subset of audio signal encodings based on a clustering technique applied to the extracted audio features.

5. The method of claim 3, further comprising:

identifying the subset of audio signal encodings based on a distance measure calculated from the extracted audio features.

6. The method of claim 1, wherein the aggregating is based at least in part on the confidence ratings determined as part of the computational estimation of vocal pitch.

7. A computer program product encoded in one or more non-transitory machine-readable media, the computer program product including instructions executable on a processor of a service platform to cause the service platform to:

receive a plurality of audio signal encodings for respective vocal performances captured in correspondence with a backing track;

preprocess the plurality of audio signal encodings for respective vocal performances, wherein the preprocessing comprises one or more of: time-aligning the audio signal encodings for respective vocal performances based on latency metadata, and normalizing the audio signal encodings for respective vocal performances;

identify, from the plurality of audio signal encodings, a subset of audio signal encodings;

process the subset of audio signal encodings to computationally estimate, for each of the vocal performances corresponding to the subset of audio signal encodings, a time-varying sequence of vocal pitches;

aggregate the time-varying sequences of vocal pitches computationally estimated from the vocal performances; and based at least in part on the aggregation, supply a computer-readable encoding of a resultant pitch track for use as either or both of (i) vocal pitch cues and (ii) pitch correction note targets in connection with karaoke-style vocal captures in correspondence with the backing track.

8. The computer program product of claim 7, further comprising instructions to cause the service platform to utilize metadata associated with the plurality of audio signal encodings to identify the subset of audio signal encodings.

9. The computer program product of claim 7, further comprising instructions to cause the service platform to extract one or more audio features from each of the plurality of audio signal encodings to identify the subset of audio signal encodings.

10. The computer program product of claim 9, further comprising instructions to cause the service platform to identify the subset of audio signal encodings based on a clustering technique applied to the extracted audio features.

11. The computer program product of claim 9, further comprising instructions to cause the service platform to identify the subset of audio signal encodings based on a distance measure calculated from the extracted audio features.

12. The computer program product of claim 7, further comprising instructions to cause the service platform to aggregate based at least in part on the confidence ratings determined as part of the computational estimation of vocal pitch.

13. A pitch track generation system comprising:

a content server configured to:

receive a plurality of audio signal encodings for respective vocal performances captured in correspondence with a backing track;

preprocess the plurality of audio signal encodings for respective vocal performances, wherein the preprocessing comprises one or more of: time-aligning the audio signal encodings for respective vocal performances based on latency metadata, and normalizing the audio signal encodings for respective vocal performances;

identify, from the plurality of audio signal encodings, a subset of audio signal encodings;

process the subset of audio signal encodings to computationally estimate, for each of the vocal performances corresponding to the subset of audio signal encodings, a time-varying sequence of vocal pitches;

aggregate the time-varying sequences of vocal pitches computationally estimated from the vocal performances; and based at least in part on the aggregation, supply a computer-readable encoding of a resultant pitch track for use as either or both of (i) vocal pitch cues and (ii) pitch correction note targets in connection with karaoke-style vocal captures in correspondence with the backing track.

14. The system of claim 13, wherein the content server is further configured to utilize metadata associated with the plurality of audio signal encodings to identify the subset of audio signal encodings.

15. The system of claim 13, wherein the content server is further configured to extract one or more audio features from each of the plurality of audio signal encodings to identify the subset of audio signal encodings.

16. The system of claim 15, wherein the content server is further configured to identify the subset of audio signal encodings based on a clustering technique applied to the extracted audio features.

17. The system of claim 15, wherein the content server is further configured to identify the subset of audio signal encodings based on a distance measure calculated from the extracted audio features.

18. The system of claim 13, wherein the content server is further configured to aggregate based at least in part on the confidence ratings determined as part of the computational estimation of vocal pitch.

* * * * *